United States Patent [19]

Mackenzie et al.

[11] Patent Number: 4,652,535

[45] Date of Patent: Mar. 24, 1987

[54] ALKALINE-RESISTANT GLASS BODIES AND FIBERS

[75] Inventors: John D. Mackenzie, Los Angeles; Tetsuro Horiuchi, Gardena, both of Calif.

[73] Assignee: Ensci Incorporated, Chatsworth, Calif.

[21] Appl. No.: 849,584

[22] Filed: Apr. 8, 1986

Related U.S. Application Data

[63] Continuation of Ser. No. 537,255, Sep. 28, 1983, abandoned, which is a continuation-in-part of Ser. No. 430,743, Sep. 30, 1982, abandoned.

[51] Int. Cl.[4] .................... C03C 6/02; C03C 12/00; C03C 13/00; C03C 3/087
[52] U.S. Cl. ........................................ 501/27; 501/33; 501/35; 501/70
[58] Field of Search .................. 501/27, 33, 35, 70

[56] References Cited

U.S. PATENT DOCUMENTS

| | | | |
|---|---|---|---|
| 2,973,563 | 3/1961 | Leaberry et al. | 501/35 |
| 3,736,162 | 5/1973 | Chvalovsky et al. | 501/35 |
| 3,874,886 | 4/1975 | Levecque et al. | 501/35 |
| 4,090,882 | 5/1978 | Rauschenfels | 501/35 |
| 4,325,724 | 4/1982 | Froberg | 501/35 |

FOREIGN PATENT DOCUMENTS

| | | | |
|---|---|---|---|
| 55-3367 | 1/1980 | Japan | 501/35 |
| WO82/03386 | 10/1982 | PCT Int'l Appl. | 501/35 |

OTHER PUBLICATIONS

Breck, D. W.; "Zeolite Molecular Sieves", 1974, John Wiley & Sons, New York, pp. 493–494.
Banba, T., et al.; "Safety Evaluation of Simulated High Level Waste Glass Products (I) (Thermal Stability)", from INIS Atom index 1980, 11 (24).
Abstract No. 571,744, Tokai Res. Establ., Japan At. Energy Res. Inst., Tokai, Japan, Report 1980, JAERI--M-8706, 20 pages.

Primary Examiner—Mark L. Bell
Attorney, Agent, or Firm—Frank J. Uxa

[57] ABSTRACT

The invention relates to glasses formed from modified naturally occurring zeolites and in particular to alkaline-resistant glasses containing a high calcia loading.

20 Claims, 2 Drawing Figures

ALKALI RESISTANCE RELATED TO THE AMOUNT OF $CaCO_3$

ALKALINE-RESISTANT GLASS BODIES AND FIBERS

RELATED APPLICATIONS

This is a continuation of application Ser. No. 06/537,255, filed 9-28-83, now abandoned, which is a continuation-in-part of Ser. No. 430,743, filed 9-30-82, now abandoned.

BACKGROUND OF THE INVENTION

1. Field

The invention herein relates to alkaline-resistant glasses. While it pertains to glass bodies generally, it has particular pertinence to glasses which are fiberizable.

2. State of the Art

The natural mineral zeolites are a group of hydrous alkali and/or alkaline earth aluminosilicates which have an open three-dimensional crystalline framework. While a large number of individual mineral zeolites are known and have been described in the literature, eleven (11) minerals make up the major group of mineral zeolites: analcime, chabazite, clinoptilolite, erionite, ferrierite, heulandite, laumontite, mordenite, natrolite, phillipsite and wairakite. The chemical and physical properties of these major mineral zeolites, as well as the properties of many of the minor mineral zeolites, are described extensively in Lefond (ed.), *Industrial Minerals and Rocks* (4th Ed., 1975), pp. 1235–1274; Breck, *Zeolite Molecular Sieves* (1974), especially Chapter 3; and Mumpton (ed.), *Mineralogy and Geology of Natural Zeolites*, Vol. 4 (Mineralogical Society of America: November, 1977). These publications also describe the geologic occurrence of the natural mineral zeolites and some industrial and agricultural uses which have been proposed or in which the natural mineral zeolites are now being used commercially It is important to note that the natural mineral zeolites are an entirely different class of materials from the "synthetic zeolites" which have been widely described in many recent articles and patents. Because there is no universally recognized system for naming the synthetic zeolites, and because some of the synthetic materials exhibit x-ray diffraction patterns which suggest possible similarities in structure with the natural mineral zeolites, some reports in the literature and patents have described certain synthetic zeolites as "synthetic" versions of the natural mineral zeolites. Thus, for instance, certain synthetic zeolites have been described as "synthetic analcime" or "synthetic mordenite" and so forth. As noted in the aforementioned Breck reference, however, this approach is technically unsound and has merely led to confusion between the two (2) otherwise distinct classes of materials: the natural mineral zeolites and synthetic zeolites. While it has been recognized that there are structural similarities between the two groups, it is clear that the natural mineral zeolites constitute a class of materials significantly separate and distinct in structure and properties from the synthetic zeolites.

Glasses are vitreous materials composed largely of silica. Because silica is a highly refractory material, however, substantial quantities of soda ash, lime or other fluxing materials are added to the silica to permit the glass-forming composition to be melted at reasonable temperatures. Small quantities of other materials, usually elemental materials or oxides, are commonly added to glass melts to provide particular properties such as color or chemical resistance to the finished glass. Heretofore, however, there has not been any report of significant usage of zeolites in glass matrices and particularly as the principal component of a glass matrix. One experiment has been reported in which a clinoptilolite and glass mixture was fired at 800° C. (well below the melting point of either) to produce what was described as a porous low density glass composition; see Mumpton, supra, p. 197, referring to Tamura Japanese published application No. 74/098,817 (1974).

Alkaline resistance is provided in some glasses by the inclusion of zirconia and/or titania, such as in AR glasses of Pilkington. Although these materials enhance the alkaline resistance of glass bodies, these are refractory materials which increase the melting point of such glasses. Also, zirconia and titania tend to add cost to the glass inasmuch as these are much more expensive materials than silica, soda, calcia and the usual components of soda lime silica glasses.

Although calcia tends to lower the melting point of the glass composition, a general admonition exists in the glass technology against using calcium oxide in quantities greater than about fifteen percent (15%) by weight of soda-lime-silica glass bodies.

OBJECTS OF THE INVENTION

It is an object of the invention to produce alkaline-resistant glasses from modified, naturally occurring zeolite materials.

Another object of the invention is to modify naturally occurring zeolite materials with readily available alkaline earth compounds.

A further object of the invention is to form glass bodies from modified naturally occurring zeolites at relatively low temperatures.

SUMMARY OF THE INVENTION

Figure 1:
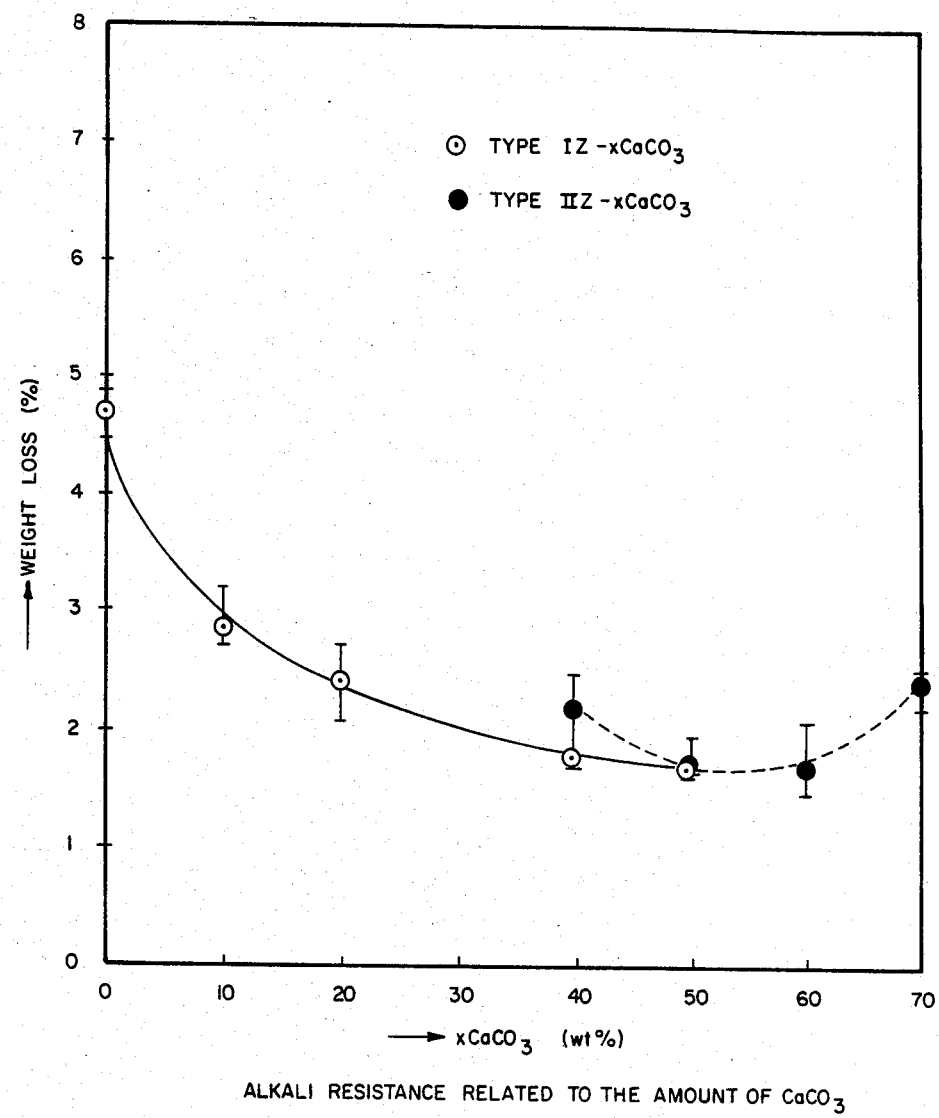
FIG. 1 is a graph depicting weight loss of a glass body exposed to dilute caustic soda.

The invention herein comprises glass compositions which have outstanding resistance to alkaline environments. Such glass compositions are characterized by a relatively high alkaline earth metal oxide, especially calcia, content and a low silica content. In particular, these glass compositions are derived from a naturally occurring zeolite to which alkaline earth compounds, especially calcium compounds or materials containing calcium and magnesium compounds are added to yield a low-silica, high-alkaline earth oxide, especially calcia, glass composition. Also included within the scope of the present invention are glass bodies, particularly fibers, formed from the aforesaid glass composition.

DETAILED DESCRIPTION AND PREFERRED EMBODIMENTS

The present invention relates to alkaline-resistant glasses containing relatively high quantities of one or more alkaline earth metal oxides and particularly to glasses comprising silica, alumina, calcia and combinations of calcia and magnesia. A particularly useful alkaline-resistant glass containing a pre-reacted naturally occurring zeolite having compositions in the following range:

Silica—about 30% to about 60% by weight, alumina—about 2% to about 20% by weight, calcia—about 20% to about 60% by weight, magnesia—about 0% to about 30% by weight wherein the calcia plus magnesia content is from about 30% to about 60% by weight. Minor quantities of soda, potassia, iron and the like may also be present.

A preferred composition comprises at least 27% by weight calcia and at least 13% by weight alumina. A glass body, e.g., a fiber, having calcia present from about 27% to about 35% by weight is particularly useful. It is significant, as described hereinafter, that such glasses may be easily and inexpensively formed by melting a calcium compound, in the form of limestone, for example, or a calcium compound and a magnesium compound such as found in dolomite with a naturally occurring zeolite. Such glasses may be described as low to moderate alumina, calcium silicate glasses inasmuch as the calcium, in many instances, is present in about the same quantity, on a weight basis, as is the silica.

The alkaline-resistant glass composition may be readily formed by mixing calcium carbonate with a naturally occurring zeolite material. As indicated in copending United States patent application of Clough et al, Ser. No. 360,516, filed Mar. 22, 1982, now U.S. Pat. No. 4,607,015, commonly assigned, many naturally occurring zeolite materials may be formed into glasses under appropriate conditions. The zeolites, as a glass-forming material, have many advantages. Naturally occurring zeolites have already undergone reaction and the various elements contained therein are intimately mixed and reacted with one another. Also, the zeolite materials are particularly useful inasmuch as they have a very low sulphur content. In particular, very useful glass bodies may be formed by combining various quantities of alkaline earth metal materials, especially compounds of calcium or calcium and magnesium combinations with a zeolite of the following compositional range:

Silica—about 60% to about 78%, alumina—about 6% to about 30%, $Fe_2O_3$—about 1% to about 3%, calcia—about 0% to about 15%, magnesia—about 0% to about 5%, potassia—about 1% to about 2%, soda—about 1% to about 2%, with the percentage expressed being in weight percent.

Very minor quantities of many other compounds may be present in the zeolite as is typical with most minerals. Other compounds are present in quantities of less than 1% by weight and are usually present in quantities less than about 0.1% by weight. Such materials may include compounds of vanadium, titanium, copper, zinc, tungsten, zirconia and the like.

Naturally occurring zeolites have varying ratios of components within the above-stated compositional ranges. Many naturally occurring zeolites have an alumina to silica ratio of about 1:5 although ratios of about 1:2.0 are found in analcime, laumontite, phillipsite and the like. Utilization of these high alumina zeolite materials in a glass-forming batch of raw materials admits of the production of glasses with alumina contents of upwards of about 20%, if desired.

In particular, it has been found that additions of from 40% to about 70% by weight, and in particular from about 40% to about 60% by weight calcium carbonate mixed with a zeolite results, after melting of the finely ground material, in a glass having excellent resistance to an alkaline environment. Furthermore, these glasses advantageously melt at temperatures from about 1250° C. to about 1500° C. Also, glasses formed by mixing zeolite with similar weight percentages of dolomite, i.e. about 40% to 70% by weight of dolomite, result in glasses having comparable properties to those formed by addition of calcium carbonate. Although carbonates are preferred reactants, other salts or compounds of alkaline earth metals, especially calcium and magnesium, could be utilized.

A glass-forming composition may be readily formed by mixing finely ground limestone with a finely ground zeolite material, such as the composition identified above. The zeolite material, inasmuch as it is a pre-reacted crystalline material, largely calcium aluminum silicates, reacts readily and efficiently with the calcium carbonate of the limestone to form a glass composition having a high calcia loading. Calcia loadings of about 40% to 50% calcium carbonate tend to provide slightly lower melting points than loadings involving 60% to 70% by weight calcium carbonate, based upon a weight of 100% equalling the total weight of the zeolite and calcium carbonate.

The glass material, upon cooling, exhibits good physical properties, having strengths and other qualities substantially equivalent to a typical soda-lime silicate glass and having resistance to alkaline solutions from about ten-fold to twenty-fold better than a typical soda-lime silicate window glass. Also, the resistance to alkali attack tends to increase as the calcia content increases from about 40% to about 50% by weight of calcium carbonate in the mix and then tends to decrease slightly with loadings of 70% calcium carbonate contributing less resistance to dilute caustic soda than a glass with 40% loading.

Besides increasing the durability of the glass in alkaline environments, glasses containing high calcia loading have other advantages as well. The calcia addition tends to even out variances in the zeolite composition. Zeolites are naturally occurring materials and are not homogenous or uniform in their composition. Also, the zeolites contain iron which tends to contribute a brown color to the glass. Calcia, on the other hand, tends to contribute a light green color, which for many purposes is preferable to brown colored glass.

The zeolites contain relatively substantial quantities of water, that is, hydrated materials. Hydrated crystalline materials generally tend to melt at a lower temperature than non-hydrated materials. Thus, there are further advantages to beginning the glass-forming operation with a pre-reacted zeolite, rather than initiating it with silica.

The melting ranges of the calcia-modified aluminum-silicate glasses of this invention come within a range, i.e. about 1250° C. to about 1500° C., which permits the drawing of glass fibers through platinum dies. The glass fibers could also be formed by spinning or other techniques. However, formation of continuous strands is best accomplished by drawing the molten glass through an orifice in a platinum or platinum-rhodium body.

Fibers, as continuous strands or mats, of the glass compositions of this invention are particularly useful inasmuch as they may be used to strengthen bodies which are highly alkaline in nature, for example, cement and plaster. Such fibers may also be used to strengthen organic matrices of various types. Reinforcement of cement with such fibers, however, provides a particularly advantageous use inasmuch as asbestos has been frequently used heretofore for that purpose. Because of various health and/or environmental concerns, the use of asbestos is being discontinued.

EXAMPLE I

The compositions and alkaline resistance of the above-identified glasses was noteworthy. The chemical durability of an unmodified zeolite glass, common window glass and commercial AR glass are set forth in Tables III and IV.

TABLE I

Chemical Composition of Glasses Formed From Zeolite and $CaCO_3$ or Dolomite

| Oxide (wt %) (Calculated Batch Composition) | Type IZ | | Type IIZ | | | | Type IIZ | |
|---|---|---|---|---|---|---|---|---|
| | *40CaCO$_3$ | 50CaCO$_3$ | 40CaCO$_3$ | 50CaCO$_3$ | 60CaCO$_3$ | 70CaCO$_3$ | 50 Dolomite | 60 Dolomite |
| SiO$_2$ | 45.58 | 39.19 | 54.56 | 47.69 | 40.12 | 31.72 | 48.97 | 41.49 |
| Al$_2$O$_3$ | 5.39 | 4.63 | 9.38 | 8.21 | 6.91 | 5.46 | 8.43 | 7.14 |
| Fe$_2$O$_3$ | 1.57 | 1.35 | 0.59 | 0.51 | 0.42 | 0.34 | 0.53 | 0.44 |
| CaO | 42.44 | 50.50 | 29.39 | 38.27 | 48.07 | 58.94 | 21.52 | 27.12 |
| MgO | 3.15 | 2.71 | 0.30 | 0.26 | 0.21 | 0.16 | 15.36 | 19.40 |
| K$_2$O | 1.19 | 1.02 | 3.02 | 2.64 | 2.22 | 1.76 | 2.71 | 2.30 |
| Na$_2$O | 0.68 | 0.60 | 2.77 | 2.42 | 2.04 | 1.61 | 2.49 | 2.11 |

*40CaCO$_3$ means the mixture of 60 wt % Zeolite + 40 wt % CaCO$_3$

TABLE II

Properties of Glasses Formed From Zeolite and $CaCO_3$ or Dolomite

| Property | Type IZ | | Type IIZ | | | | Type IIZ | |
|---|---|---|---|---|---|---|---|---|
| | 40CaCO$_3$ | 50CaCO$_3$ | 40CaCO$_3$ | 50CaCO$_3$ | 60CaCO$_3$ | 70CaCO$_3$ | 50 Dolomite | 60 Dolomite |
| Density d (g/cc) | 2.78 | 2.82 | 2.74 | 2.80 | 2.85 | 2.81 | 2.79 | 2.77 |
| Thermal Property | | | | | | | | |
| (/°C.) | $83 \times 10^{-7}$ | $83 \times 10^{-7}$ | $84 \times 10^{-7}$ | $89 \times 10^{-7}$ | $87 \times 10^{-7}$ | $74 \times 10^{-7}$ | $78 \times 10^{-7}$ | $76 \times 10^{-7}$ |
| $T_g$ (°C.) | 667 | 686 | 692 | 697 | 720 | 734 | 667 | 706 |
| $T_D$ (°C.) | 712 | 729 | 732 | 737 | 760 | 766 | 707 | 743 |
| $T_S$ (°C.) | 842 | | | | | | | |
| T (°C.) $10^3$ poise | 1250 | 1400 | 1350 | 1300 | 1400 | 1500 | 1300 | 1350 |
| Chemical Durability | | | | | | | | |
| 5% NaOH (72) | 1.8 | 1.7 | 2.2 | 1.8 | 1.7 | 2.4 | 1.4 | 1.7 |
| H$_2$O (72) | 0.7 | 0.7 | | 0.8 | | | 1.0 | |
| 5% HCl (72) | | 45.7 | 64.2 | | 47.4 | | | 60.9 |
| Mechanical Property | | | | | | | | |
| Glass knoop hardness (Kg/mm$^2$) | | 583 | 541 | | | | 573 | |
| Fiber (20 μm) | | | | | | | | |
| tensile strength (psi) | | $174 \times 10^3$ | $180 \times 10^3$ | | | | $185 \times 10^3$ | |
| Youngs modulus (psi) | | $7.7 \times 10^6$ | $8.5 \times 10^6$ | | | | $8.8 \times 10^6$ | |

Naturally occurring zeolites were finely comminuted, admixed with particulate limestone or dolomite and melted to form glass bodies and fibers. The melting was conducted batch-wise in small crucibles at temperatures of about 1250° C. to about 1500° C. depending upon zeolite composition and quantity of limestone or dolomite added. Some typical limestone and dolomite modified zeolite glass compositions are tabulated in Table I.

Although the naturally occurring zeolites contain up to about twenty percent (20%) by weight volatiles, e.g. water, they are easily melted into a homogeneous mass in the presence of calcium or magnesium compounds.

TABLE III

| | Glass Composition | | |
|---|---|---|---|
| Oxide | Zeolite Glass | Window Glass | Commercial AR Glass |
| SiO$_2$ | 61.48 | 72.0 | 61.0 |
| Al$_2$O$_3$ | 10.20 | 1.3 | 1.5 |
| Fe$_2$O$_3$ | 3.00 | — | — |
| CaO | 16.65 | 8.2 | 3.0 |
| MgO | 3.81 | 3.5 | — |
| K$_2$O | 2.72 | — | — |
| Na$_2$O | 2.14 | 14.3 | 16.5 |
| ZrO$_2$ | — | — | 21.0 |

TABLE IV

| | Glass Properties | | |
|---|---|---|---|
| Property | Zeolite Glass (No Calcia Addition) | Window Glass | Commercial AR Glass |
| Density d (g/cc) | 2.57 | 2.50 | 2.74 |
| Thermal Property | | | |
| (Expansion Coefficient/°C.) | $70 \times 10^{-7}$ | $90 \times 10^{-7}$ | $80 \times 10^{-7}$ |
| Annealing $T_g$ (°C.) $10^{14}$ poise | 592 | 530 | 692 |
| Deformation $T_D$ (°C.) $10^{11.5}$ | 722 | 536 | 755 |
| Littleton Softening $T_S$ (°C.) $10^{7.6}$ poise | 934 | 712 | — |

TABLE IV-continued

| Property | Glass Properties | | |
| --- | --- | --- | --- |
| | Zeolite Glass (No Calcia Addition) | Window Glass | Commercial AR Glass |
| T (°C.) $10^3$ poise | 1300 | 1200 | 1500 |
| Chemical Durability (weight loss percent) | | | |
| 5% NaOH 90° C., 72 hours | 5.1 | 41.9 | 5.4 |
| $H_2O$ | 0.9 | 3.0 | 0.8 |
| 5% HCl | 5.8 | 3.9 | 3.1 |
| Mechanical Property | | | |
| Glass knoop hardness ($Kg/mm^2$) | 471 | 575 | — |
| Fiber (20 micron) | | | |
| tensile strength (psi) | $145 \times 10^3$ | $150 \times 10^3$ | $175 \times 10^3$ |
| Young's modulus (psi) | $5.1 \times 10^6$ | $7.5 \times 10^6$ | $7.7 \times 10^6$ |

The calcia- and/or magnesia-modified naturally occurring zeolite glasses demonstrate alkaline resistivity, see Table II, which is a factor of two (2) better than the specially formulated chemical resistant AR-Glass and a factor of twenty (20) better than a window glass. The moisture resistance of these modified zeolite glasses were equivalent to the AR-Glass and far better than window glass.

Although the modified zeolite glasses had lower resistance to acidic environments than window glass or AR glass, there are many alkaline environments which inexpensive, easily melted and formed glasses will not endure. For example, cement and plaster cannot be reinforced with inexpensive fiber glass materials while glasses such as zirconia-containing AR-Glass are too expensive for use in such inexpensive bodies.

The relationship between glass composition of the calcia- or calcia-magnesia-modified naturally occurring zeolites is illustrated in FIG. 1. The susceptibility to attack by alkaline media, namely 5% NaOH solution, expressed as weight loss of a glass having a calcia content determined by addition of about 40% to 60% by weight of calcium carbonate to the glass batch.

Figure 2:
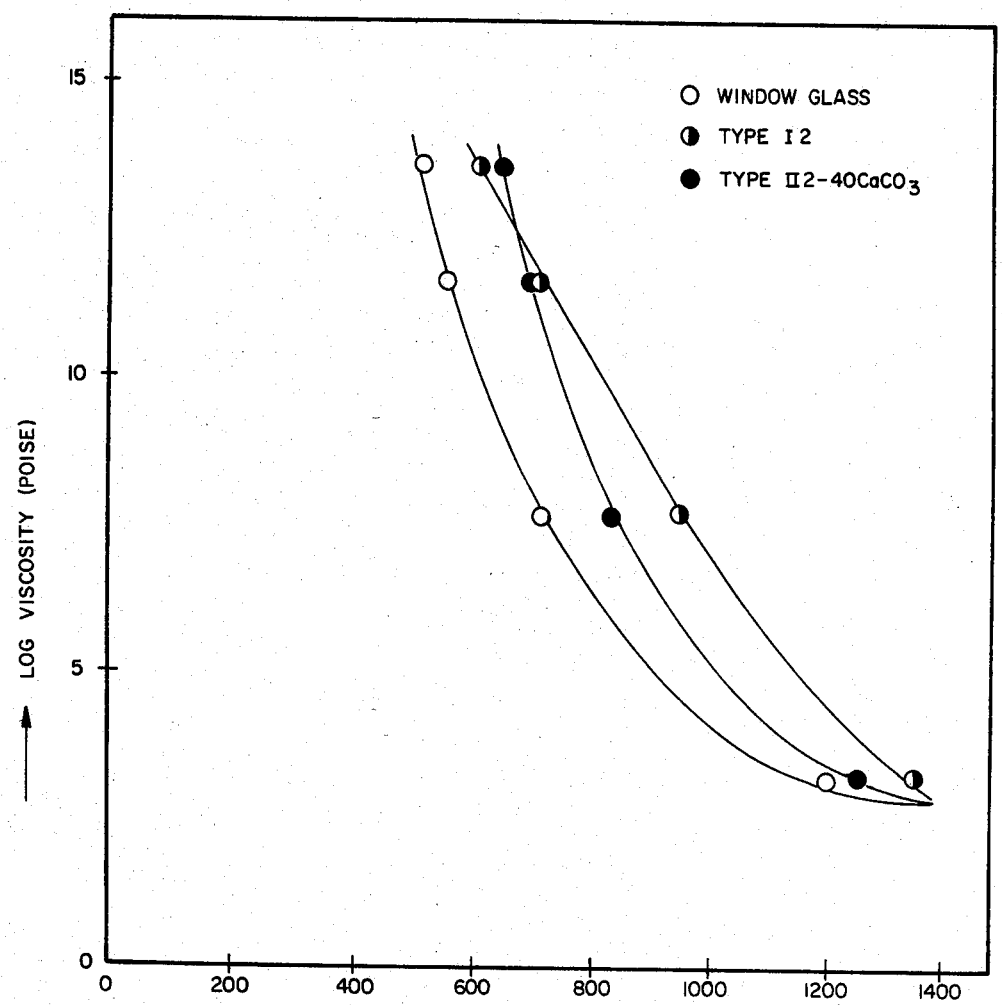
FIG. 2 is a graph illustrating the viscosity-temperature relationship of a glass of this invention and a commercial window glass.

A graph denoting the relationship of viscosity of a calcia-modified zeolite in comparison with window glass is illustrated in FIG. 2. The calcia-modified zeolite has a steeper curve, which indicates a better high temperature performance range than window glass even though the melting temperatures are similar. Temperature units are degrees centigrade.

EXAMPLE II

Glass fibers were continuously drawn through a platinum bushing at bushing temperatures of about 1300° C. from molten glasses formed from calcium-carbonate-modified naturally occurring zeolites.

The continuous fibers had properties comparable to the fibers of a similar composition set forth in Example I.

It is significant that glass compositions containing such high loadings of calcia or calcia and magnesia are fiber forming and have excellent mechanical properties, such as tensile strength comparable to commercial window glass. These modified zeolite glasses are relatively low in iron content and possess an unobjectionable light green color.

The outstanding tolerance to alkaline environments render these glasses, especially in fiber or flake form, as excellent reinforcement materials for concrete, plaster and other inorganic matrices of an alkaline nature. This is especially significant inasmuch as asbestos, which has been a standard extender as reinforcement material in cement and concrete bodies, is considered undesirable because of the health hazard it may present.

The glasses of this invention have excellent resistance to moisture degradation and do not degrade or deteriorate during normal or extended storage periods.

The low sulfate content of naturally occurring zeolites is important in their utilization as ingredients in glass-forming processes. Sulfates tend to degrade during glass melting conditions, yielding sulfur dioxide and other objectionable sulfur compounds. Environmental concerns militate against use in glassmaking processes of any raw material containing sulfates, sulfites and other sulfur compounds.

Although the instant invention has been described as having high loadings of calcia, it is to be recognized that at least minor substitutions of other alkaline earth metal oxides in lieu of calcia may be made. For example, magnesium compounds, particularly magnesium carbonate may be substituted for at least some of the calcium carbonate in preparing a batch for melting into an alkaline-resistant glass. Similarly, barium and strontium compounds may be substituted as well as beryllium compounds, many of which are naturally occurring materials found in the same geographic regions as zeolites.

The oxides of alkaline earth metal elements are not considered glass formers, which is a term applied to elements having a valence greater than three, e.g. silicon, boron, and phosphorous, which may form three-dimensional networks their oxides, namely, silica, boric oxide, and various oxides of phosphorous. Alkaline earth metal elements, being divalent, are more tightly bound in a glass than are alkali metal elements.

Sources of alkaline earth metals to form oxides in the glasses of this invention are as follows:

| Alkaline Earth Metal Compound | Source |
| --- | --- |
| Calcium Carbonate | Limestone |
| | Marble |
| | Chalk |
| Magnesium Carbonate | Dolomite |
| Magnesium Silicate | Serpentine |
| Barium Carbonate | Wetherite |
| Strontium Carbonate | Strontianite |
| Beryllium Aluminum Silicate | Beryl |

Sources of calcium and magnesium carbonates are generally more plentiful and cheaper than sources of barium, strontium or beryllium compounds. Also, beryllium metal is considered toxic, although beryllium oxides bound within a glass body are not hazardous.

It is noteworthy that the zeolite-derived glasses of this invention have good working properties and strength in addition to outstanding alkaline resistance. These glasses may be used in any form, e.g. containers, sheets, fibers and the like, and especially for any use in which transparency or colorlessness are not required. The glasses may be used as flakes, bubbles (microspheres), fibers and the like to reinforce organic or inorganic matrices, especially cement, plaster and the like.

Although the zeolite may be present in the glass-forming batch in various quantities, generally the zeolite provides a significant portion of the glass-forming materials, e.g., silica and alumina. It is preferred that the predominant quantity of glass-formers present be provided by the zeolite materials. Other glass-formers, fluxes and typical additives to glass-forming compositions may be included in the batch, although the properties of the resulting glass may be altered somewhat. For example, additional fluxes, such as soda or potassia, in the batch will tend to reduce the melting temperature but may diminish alkaline resistivity somewhat of the resulting glass body. The inclusion of very minor quantities of other materials will, in general, not significantly alter the properties of the resulting glass.

It is, of course, within the ambit of the invention to blend zeolites from various sources to obtain a batch component having optimum quantities of silica, alumina and alkaline earth metal compounds.

We claim:

1. A glass-forming composition having high alkali resistance when formed in a glass body, said glass-forming composition comprising: naturally occurring pre-reacted zeolite in sufficient quantity to provide a significant portion of the glass-forming ingredients admixed with a significant quantity of an alakline earth metal containing material so that said resulting glass body contains about 20% to about 60% by weight of alkaline earth metal oxide, calculated as alkaline earth metal oxide.

2. The glass-forming composition of claim 1 wherein said zeolite is present as about 40% to about 70% by weight and said alkaline earth metal containing material is present from about 60% to about 30% by weight.

3. The glass-forming composition of claim 1 wherein said alkaline earth metal containing material contains calcium carbonate.

4. The glass-forming composition of claim 1 wherein said alkaline earth metal containing material contains substantial quantities of at least one magnesium compound.

5. The glass-forming composition of claim 3 wherein said calcium carbonate containing material is provided as dolomite.

6. The glass-forming composition of claim 3 wherein at least a portion of said calcium carbonate may be substituted with a compound of magnesium, barium, strontium or beryllium.

7. A method of forming an alkaline-resistant glass body comprising: melting a naturally occurring pre-reacted zeolite present in sufficient quantity to provide a significant portion of the glass forming ingredients in the presence of sufficient alkaline earth metal compound at a temperature of about 1250° C. to about 1400° C. to form a glass body having an alkaline earth metal oxide content in the range of about 20% to about 60% by weight, calculated in alkaline earth metal oxide.

8. A glass-forming composition having high alkali resistance when formed in a glass body, said glass-forming composition comprising: naturally occurring pre-reacted zeolite present in sufficient quantity to provide a significant portion of the glass forming ingredients and at least one added alkaline earth metal component so that said resulting glass body contains about 20% to about 60% by weight of alkaline earth metal oxide, calculated as alkaline earth metal oxide.

9. The composition of claim 8 wherein said added alkaline earth metal component is a calcium component.

10. The composition of claim 8 wherein said resulting glass body contains about 30% to about 60% by weight of silica and about 2% to about 20% by weight of alumina.

11. The composition of claim 9 wherein said resulting glass body contains about 30% to about 60% by weight of silica and about 2% to about 20% by weight of alumina.

12. The composition of claim 10 wherein said resulting glass body contains about 20% to about 60% by weight of calcia and about 0% to about 30% by weight of magnesia, provided that the amount of calcia plus magnesia is about 30% to about 60% by weight.

13. The composition of claim 11 wherein said glass composition contains about 20% to about 60% by weight of calcia and about 0% to about 30% by weight of magnesia, provided that the amount of calcia plus magnesia is about 30% to about 60% by weight.

14. The composition of claim 8 wherein said glass composition contains about 27% to about 60% by weight of calcia.

15. The composition of claim 14 wherein said glass composition contains about 30% to about 60% by weight of silica and about 13% to about 20% by weight of alumina.

16. The composition of claim 15 wherein said glass composition contains about 27% to about 35% by weight of calcia.

17. The composition of claim 8 wherein said glass composition contains about 40% to about 60% of said zeolite and about 60% to about 30% by weight of said added alkaline earth metal component, calculated as alkaline earth metal oxide.

18. The composition of claim 9 wherein said calcium component consists essentially of calcium carbonate.

19. The composition of claim 8 wherein said added alkaline earth metal component comprises a mixture of calcium component and magnesium component.

20. The composition of claim 8 wherein said alkaline earth metal component is dolomite.

* * * * *